Dec. 7, 1937. T. H. JACOB 2,101,545
SPRING SUSPENSION FOR TRAILERS
Filed Oct. 22, 1936 2 Sheets-Sheet 1
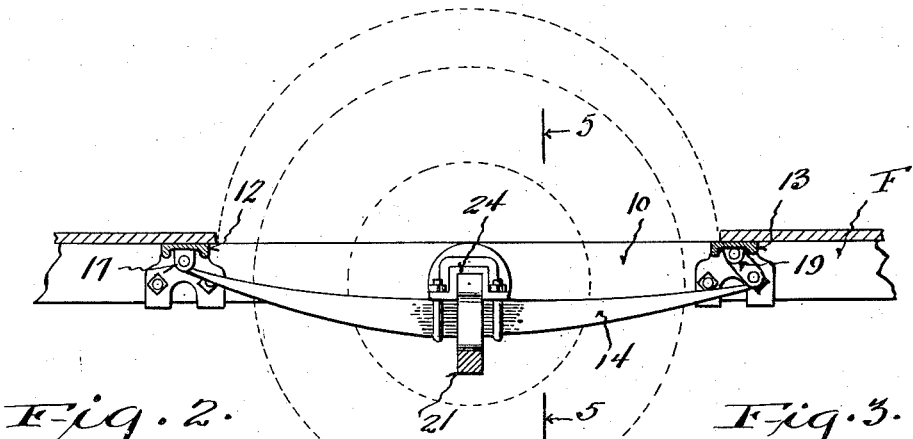
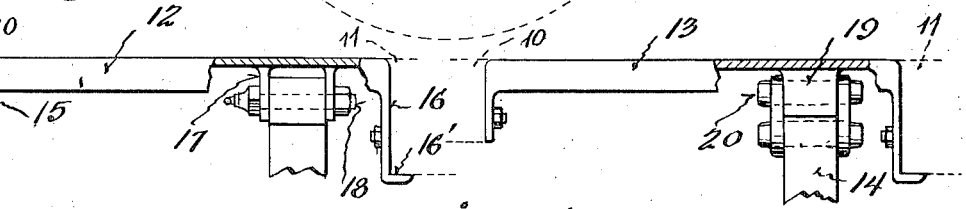
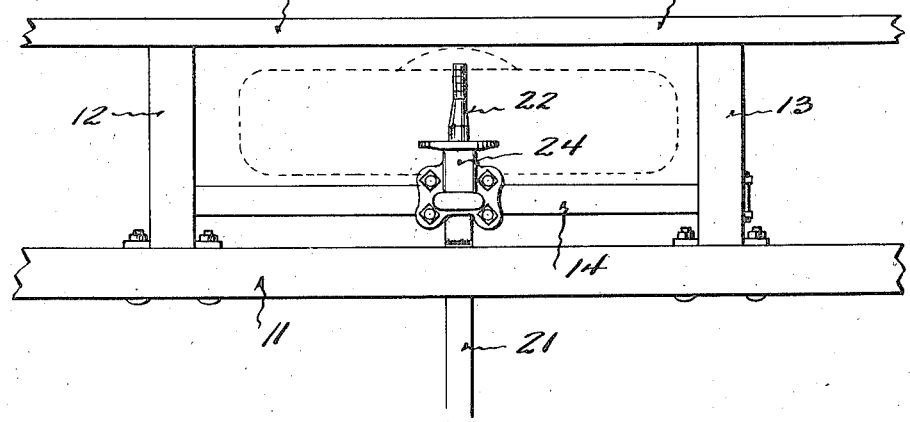
Inventor
T. H. Jacob Dec. 7, 1937. T. H. JACOB 2,101,545
SPRING SUSPENSION FOR TRAILERS
Filed Oct. 22, 1936 2 Sheets-Sheet 2

Inventor
T. H. Jacob

Patented Dec. 7, 1937

2,101,545

UNITED STATES PATENT OFFICE 2,101,545

SPRING SUSPENSION FOR TRAILERS

Thomas H. Jacob, Wausau, Wis.

Application October 22, 1936, Serial No. 107,011

2 Claims. (Cl. 280—106.5)

This invention appertains to axles and spring suspensions therefor, and more particularly to a novel means for mounting an axle on a trailer body or chassis.

One of the primary objects of my invention is to provide an axle and spring suspension for trailers, so constructed and arranged that the axle ends and springs will be substantially at the floor level of the trailer, whereby a low center of gravity will be had for the trailer, with a maximum amount of road clearance.

Another salient object of my invention is the provision of novel means for eliminating twisting movement and lateral shifting of the axle on the frame, and for preventing side sway of the trailer.

A further important object of my invention is the provision of novel means for uniting the springs with the ends of a substantially U-shaped axle, and the spring ends with brace bars utilized for connecting the sills of the frame together, whereby not only a strong and rugged structure will be had, but whereby a relatively short spring can be employed having a minimum amount of cant.

A still further object of my invention is the provision of novel front and rear brackets utilized for rigidly connecting the sills, having depending ears for the pivot bolts of the spring, so that the spring will be slung at a high level to decrease the center of gravity of the load.

A further important object of my invention is to eliminate torque in a crank axle, which is developed when the axle is subjected to sudden braking strain.

With these and other objects in view, the invention consists in the novel construction, arrangement, and formation of parts, as will be hereinafter more specifically described, claimed, and illustrated in the accompanying drawings, in which drawings:

Figure 1 is a fragmentary longitudinal section taken substantially on the line 1—1 of Figure 5, looking in the direction of the arrows, illustrating the novel means employed for connecting the spring to the axle and the spring ends to the brace brackets.

Figure 2 is a rear elevation of the front spring bracket, with parts thereof broken away and in section to illustrate the means of connecting the spring therewith, the longitudinal sills with which the bracket is connected being shown in dotted lines.

Figure 3 is a rear elevation of the rear spring bracket, with parts thereof broken away and in section to illustrate the means of connecting the spring therewith, the longitudinal sills with which the bracket is connected being shown in dotted lines.

Figure 4 is a fragmentary top plan view illustrating the means of connecting the spring and axle to the frame.

Figure 5:
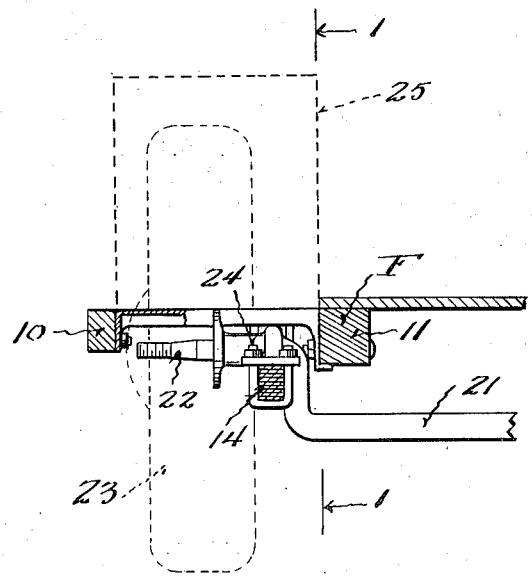
Figure 5 is a transverse section taken substantially on the line 5—5 of Figure 1, looking in the direction of the arrows.
Figure 6:
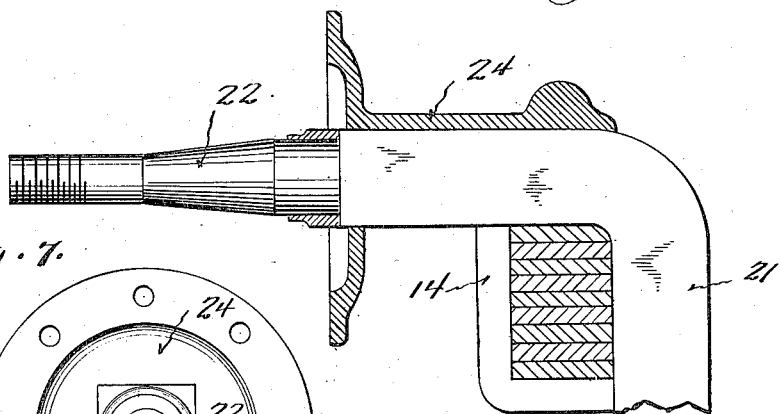
Figure 6 is an enlarged detail fragmentary section showing an axle end and the means employed for connecting the axle end with a spring.
Figure 7:
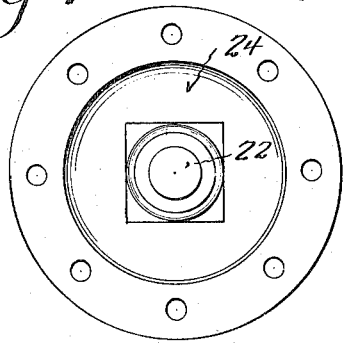
Figure 7 is a detail end elevation of the axle.

Referring to the drawings in detail, wherein similar reference characters designate corresponding parts throughout the several views, the letter F generally indicates a part of the frame of a trailer, and, as shown, the frame includes spaced longitudinally extending sills 10 and 11, which can be constructed from any preferred material.

In accordance with my invention, I rigidly connect the sills 10 and 11 by front and rear brackets 12 and 13, which are also employed for supporting the spring 14. The spring-supporting brackets 12 and 13 form an important part of my present invention, and each bracket is preferably made from a single casting of a substantially U-shape in cross section. One end of each bracket has formed thereon a depending foot or ear 15, which is rigidly bolted to one sill. The other ends of the brackets likewise have formed thereon depending feet 16, which are bolted to the other sill, and these feet 16 have in turn formed thereon right-angularly extending ears 16', which engage under the sill.

The front bracket 12 on its under face has cast thereon depending pivot ears 17 for the bolt 18 utilized for the front end of the spring. The rear bracket 13 has formed thereon a depending boss 19 for receiving the shackle bolt 20 of the rear end of the spring 14. Thus, the spring is arranged between the sills 10 and 11 and between the brackets 12 and 13, and outwardly of the inner sills 11. This allows the springs to be spaced a considerable distance apart, which tends to give the trailer a greater spread to prevent side sway.

Attention is now invited to the axle 21, and it will be seen that the same is of a substantially U-shape having outwardly extending stub ends 22 on which the wheels 23 are mounted. The springs 14, which are of the leaf type, are fitted against the stub ends in close contact with the angle portion of the axle, and a spring clip 24 of any desired type is employed for rigidly connecting the spring with the stub axle ends.

The position of the spring mounted at the bend of the axle is such that the spring is practically at the floor level. This is also brought about due to the arrangement of the brackets 12 and 13. By this construction and arrangement a low center of gravity is had for the trailer, which prevents side sway. Further, the connection of the U-shaped axle with the spring is such that the axle is not subjected to side swing or axial twisting movement, which sometimes occurs where the stub axles project in a crank-like manner from the spring. Thus, the spring is maintained in a rigid position, and all play therein is eliminated, which is now present in ordinary axle arrangements.

My construction is such that I am permitted to use a relatively short straight spring with a minimum amount of curvature or bend therein. The sills carry any desired type of fender or casing 25 for the wheel, and by referring to Figures 1, 4, and 5, it can be seen that the spring is thoroughly protected by said fender or casing.

An important development of my present invention is the provision of the drive mechanism whereby torque of the crank axle is eliminated when said axle is subjected to a sudden strain due to applying the brakes, which brakes are common in trailer structures, but form no part of my present invention, it being understood that the brake drum is attached to the spring clip 24, not shown in the illustrations.

In the present type of spring suspension device for trailers and the like, the "Hotchkiss" drive is utilized, wherein said drive is through the springs 14 and clip 17. Thus, owing to the fact that my springs are attached to the crank axle in juxtaposition to the axle center, the torque or drag is eliminated from the axle due to the practically direct pull of the springs, which are attached to the axle, as illustrated, above the crank portion thereof.

Changes in details may be made without departing from the spirit or the scope of my invention, but what I claim as new is:

1. In a spring suspension for trailers and the like, a frame including inner and outer spaced longtudinally extending sills, front and rear brackets rigidly connecting said sills, a substantially U-shaped axle extending transversely across the frame having outwardly extending stub ends arranged between the sills and the front and rear brackets, leaf springs extending under said stub ends, means securing the ends of the springs to the under face of the brackets, and means rigidly connecting the springs with the stub axle ends.

2. In a spring suspension for trailers and the like, a frame including inner and outer spaced parallel side sills, a substantially U-shaped axle extending transversely across the frame having outwardly extending stub ends disposed between the sills, front and rear brackets having depending feet rigidly secured to the sills, depending ears on said brackets, leaf springs positioned under said stub axle ends, means rigidly connecting the springs with the stub axle ends, and means connecting the ends of the spring with the ears.

THOMAS H. JACOB.